(No Model.) 2 Sheets—Sheet 1.
T. B. ROBERTS.
REFRIGERATOR CAR.
No. 500,615. Patented July 4, 1893.
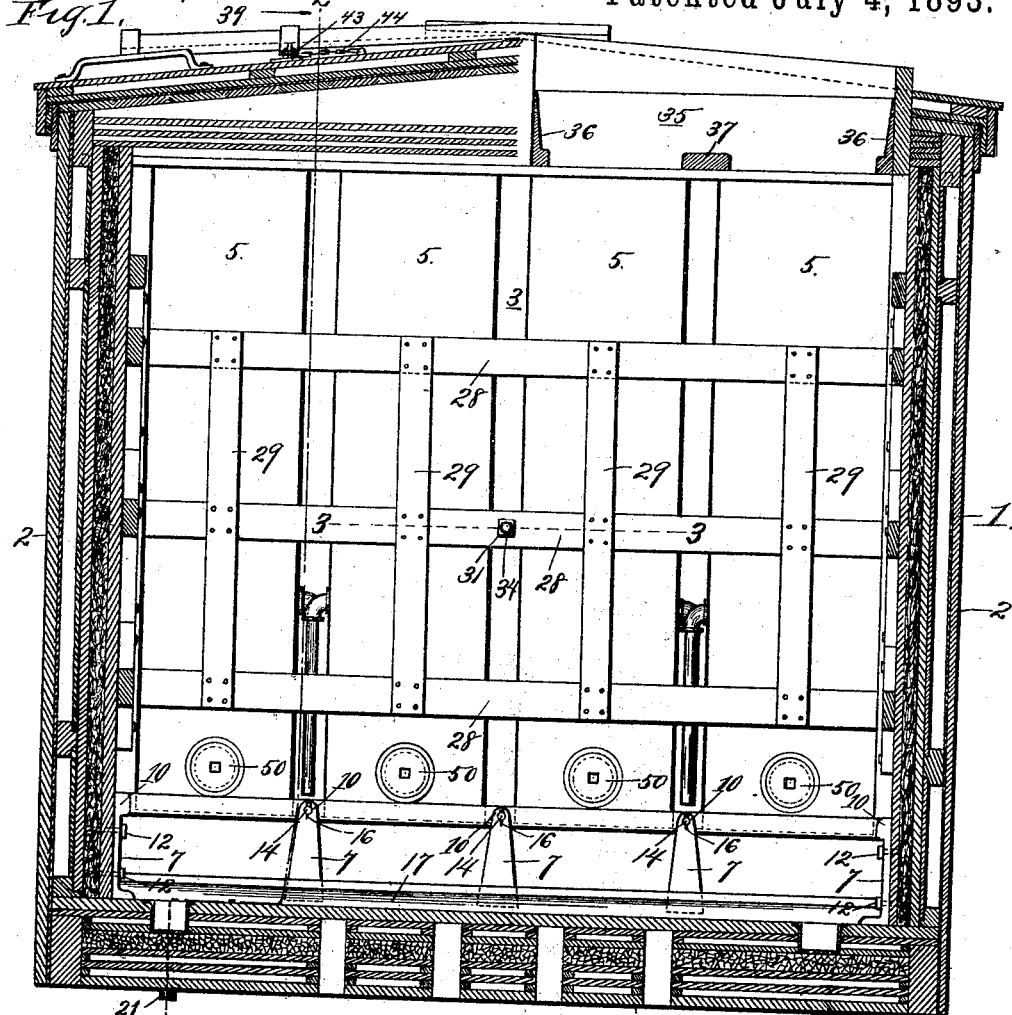
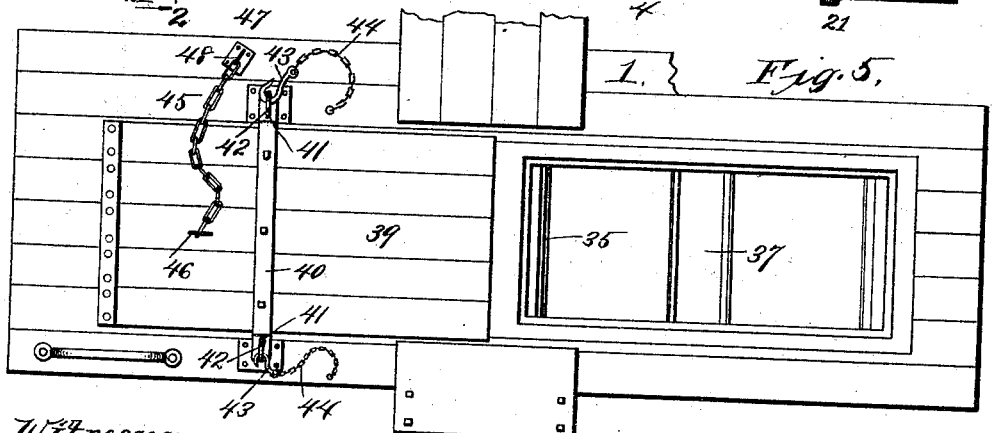
Witnesses:
M. P. Smith.
G. W. Thorpe.
Inventor:
Thomas B. Roberts,
By Higdon & Higdon
Atty's.

(No Model.) 2 Sheets—Sheet 2.
T. B. ROBERTS.
REFRIGERATOR CAR.
No. 500,615. Patented July 4, 1893.
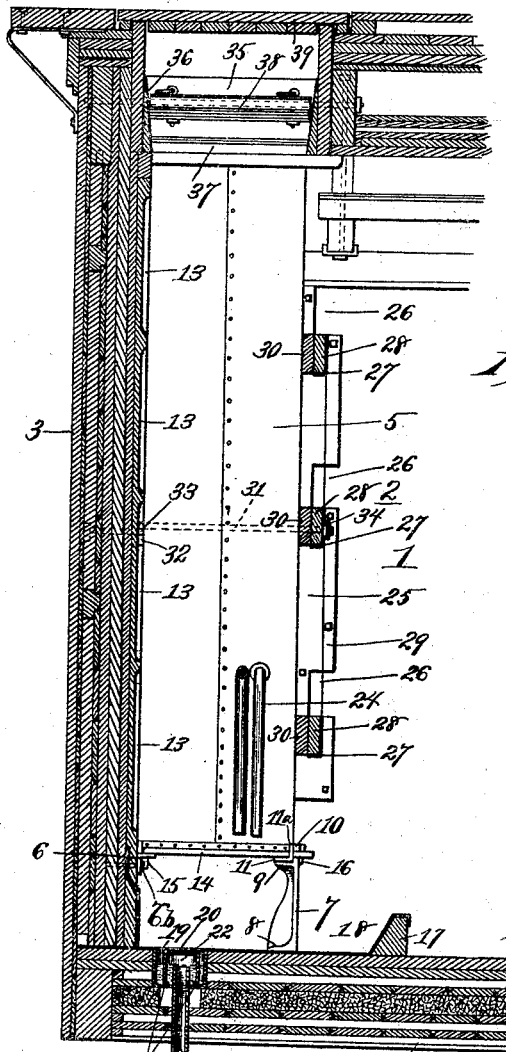
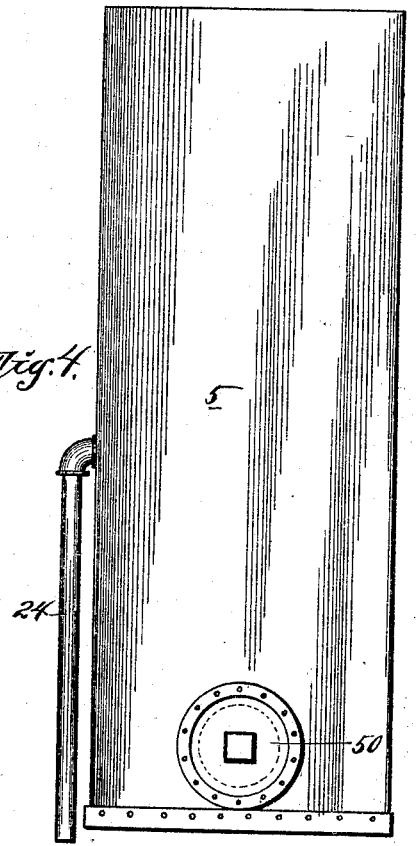
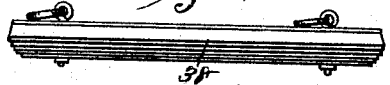
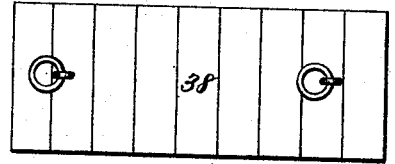
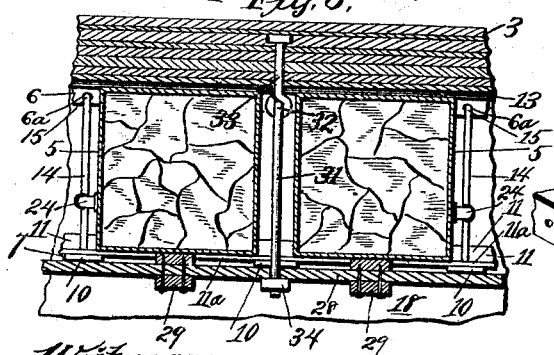
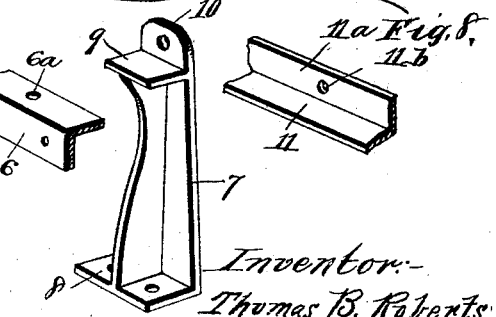
Witnesses:
M. P. Smith.
G. L. Thorpe.
Inventor:—
Thomas B. Roberts
By Higdon & Higdon
Atty's

UNITED STATES PATENT OFFICE.

THOMAS B. ROBERTS, OF KANSAS CITY, KANSAS.

REFRIGERATOR-CAR.

SPECIFICATION forming part of Letters Patent No. 500,615, dated July 4, 1893.

Application filed February 3, 1893. Serial No. 460,839. (No model.)

*To all whom it may concern:*

Be it known that I, THOMAS B. ROBERTS, of Kansas City, Wyandotte county, Kansas, have invented certain new and useful Improvements in Refrigerator-Cars, of which the following is a full, clear, and exact description, reference being had to the accompanying drawings, forming a part hereof.

My invention relates to improvements in refrigerating-cars, for the transportation of meats, fruits and other perishable goods, and the objects of my invention are to produce means whereby the refrigerating tanks or receptacles may be easily placed in position within or removed from a car, when desired; and which are simple, strong, durable and inexpensive of construction.

To the above purposes, my invention consists in certain peculiar and novel features of construction and arrangement as will be hereinafter described and claimed.

In order that my invention may be fully understood, I will proceed to describe it with reference to the accompanying drawings, in which—

Figure 1, is a vertical transverse section of a refrigerating-car, taken a short distance from one end, and showing in operative position the refrigerating tanks or receptacles. Fig. 2, is a vertical longitudinal section of a portion of the refrigerating-car, taken on the line 2—2 of Fig. 1. Fig. 3, is a sectional view of a portion of the car, taken on the line 3—3 of Fig. 1, and showing two tanks and a portion of the frame-work for supporting said tanks. Fig. 4, is a detached side elevation of one of the tanks or receptacles for ice. Fig. 5, is a top plan view of a portion of a refrigerating-car, and showing the openings in the roof, through which the tanks are supplied with ice. Figs. 6 and 7, are views in side elevation and plan, of the plug or trap-door for closing the opening at the upper end of the refrigerating tanks. Fig. 8, is a perspective view of one of the supporting brackets, and a portion of the L-shaped supporting angle irons.

In the drawings, 1 designates a refrigerating-car of the usual or any preferred exterior formation; the sides 2, the ends 3 and bottom 4 being shown as constructed with parallel walls a suitable distance apart, and some of the spaces between said walls being filled with any suitable nonconducting packing material, and also a number of spaces being left vacant to form a dead air space, in the usual manner.

In carrying out my invention, to support the tanks or ice receptacles 5, of which there are preferably four at each end of the car, but the number of which may be increased or diminished without departing from the spirit of my invention, I employ a pair of transversely arranged angle irons or plates which are L-shaped in cross-section, one of which 6, is inverted and bolted through its vertical arm or portion, at $6^b$, to the inner end wall of the car. Arranged in line with each other and transversely of and a suitable distance from the end of the car are a number of supporting brackets 7, which are approximately T-shaped in cross-section, and are provided with foot-portions 8, which rest upon and are adapted to be bolted to the floor of the car. The upper end of the said supporting brackets 7 are also recessed at their inner sides to form the horizontal shoulders or arms 9, and the vertical shoulder 10, and the companion angle iron or bracket 11 to the angle iron or plate 6, rests therein, and extends transversely of the car and from side to side thereof, the opposite ends of the said angle iron or plate 11 being supported upon the horizontal shoulder 9 of the end brackets 7, which are bolted at 12 to the side walls of the car. The tanks or receptacles 5 have their lower ends or bottoms resting upon the horizontal arms of the L-shaped brackets 6 and 11; the end tanks being supported so that a slight space shall intervene between the sides of the car and between said tanks, and the intermediate tanks are also arranged a slight distance from each other and from the end tanks, and the rear sides of all the tanks are in contact with the adjacent end of the car, which is recessed or formed with depressions 13 in its inner face to allow of the free circulation of air around the ice tanks or receptacles; the forward sides of the said tanks or receptacles bearing at their lower ends against the innerside of the vertical arm $11^a$ of the angle iron or plate 11. The rear or inverted angle iron or plate 6, is provided in its horizontal arm with vertical openings 6ᵃ and the vertical arm or portion 11ᵃ of the front angle arm 11 is also provided with horizontal openings 11ᵇ, which register with similar openings in the vertical shoulder 9 of the supporting brackets 7. Tie-bolts 14, have each a hooked end 15, engaging the openings 6ᵃ in the horizontal arm or portion of the angle iron or plate 6, and their outer ends project through the registering openings in the vertical arm 11ᵃ of angle iron or plate 11 and the vertical shoulder 9 of the supporting bracket 7, and wedges or keys 16 engage each a vertical opening in said projecting ends of the tie-bolts 14, and thus brace and secure the angle irons supporting the tanks, firmly together.

A fender 17 of wood preferably, is arranged transversely of the floor of the car and in front or inward of the supporting brackets 7, and a drip-pan 18 is formed at each end of the car beneath the tanks 5; the forward side being supported upon the fender and the rear side being secured to the end wall of the car. At each end of the drip-pans 18 a drain box is located, consisting of a cup 19, the upper open end of which registers with an opening 20 in the drip-pan, and an escape pipe or tube 21 projects upwardly through the bottom of the cup 19 a suitable distance, and at its lower end through the bottom of the car. A cap 22 is placed over the upper end of the outlet pipe, and at its lower margin rests upon the bottom of the cup 19, and is also provided with notches or openings 23 in said lower margin, to allow the water escaping from the tanks through the discharge pipes 24 to pass into the drain box, through the notches 23 of the cap 22, and overflow the upper end of the drain or outlet pipe. The water-traps thus constructed always contain sufficient water to fill the cups 19, to the upper open end of the escape pipes, and thus provide a water seal, which effectually shuts off the entrance of outside air to the interior of the car.

Bolted to each side wall of the car and directly opposite each other, near each end of the car are the retaining rails 25 which extend nearly from the top to the bottom of the tanks 5, and are at suitable points in their front edges, recessed or notched at 26, and at the inner ends of said recesses or notches 26 a second recess or depression 27 is formed, which extends downwardly a suitable distance below the bottom of notches or recesses 26, the object of which will be hereinafter explained.

A skeleton frame-work is formed of a series of horizontal and parallel beams or bars 28, which are rigidly connected together by vertical beams or bars 29 at their outer sides. These horizontal beams are arranged a distance apart corresponding to the distance between the recesses or notches in the front edge of the side retaining rails 24.

Blocks 30 are secured to the inner sides of the horizontal beams 27 by the same bolts or nails which secure the vertical bars thereto. This frame work is adapted to be located at the inner sides of the tanks 5 to prevent any accidental displacement thereof, and the manner of securing them in place is as follows:—The horizontal beams being of length equal to the inner width of the car, are adapted to be arranged transversely thereof to allow the projecting ends of said horizontal beams to register with and be forced within the notches or recesses 26 in the front edge of the retaining rails 25, until the said projecting ends of said beams or bars enter the downwardly extending recesses or depressions 27, and the blocks 30 at the inner side of the beams 27 are in contact with the outer side of said tanks; it will thus be seen that it will be impossible to move said tanks without first lifting the frames, and then moving them outward to disengage them from the said retaining rails 25.

As an additional safe guard, a tie-rod 31 is provided, which extends between the intermediate tanks and is provided with a hook 32 at its rear end, which engages the eye of a bolt 33, secured in the end wall of the car, and has its inner or front end screw-threaded and passed through an opening in the middle horizontal beam 28 of the frame-work, and a retaining nut 34 engages its projecting end.

The openings in the top of the car, through which the tanks are supplied with ice, preferably each extend over two of the tanks and are provided with a galvanized iron lining 35, the inner walls of which taper or slant upwardly and outwardly at 36. Extending transversely of each opening and midway the length thereof is a cross-bar 37 which is thus located above the space between the two tanks beneath said opening, the object of which is to guide or deflect the ice as it is lowered or dumped into the tanks, from striking the upper edges thereof and injuring the tanks. A plug 38 of contour to fit within the opening in the inner wall of the top of the car is dropped within the galvanized iron lining, and wedging between the tapering walls thereof effectually closes the opening communicating with the open ends of the tanks. A trap-door 39 is also provided to fit within and close the registering opening in the roof, and is secured therein, by a cross-bar 40, which extends transversely thereof, and is provided at its opposite ends with slots or elongated openings 41 which engage staples 42 which are in turn engaged by hooks 43 attached permanently to the roof by chains 44. Each trap-door 39 is also permanently and loosely connected to the roof by chain 45 engaging at its opposite ends a staple 46 secured in each door and a staple 48 of a plate 47 also secured permanently to the roof of the car, by bolts or in any other suitable manner. The lower ends of the ice tanks 5 are also provided with the usual hand-holes normally closed by the plugs 50. The sediment, consisting of saw-dust, dirt, &c., may thus be removed when desired, by withdrawing the plug.

From the above description, it will be seen that I have produced a refrigerator car, wherein the tanks are effectually and strongly supported in position, and means whereby the tanks may easily and quickly be placed within or removed from the car.

Having thus described my invention, what I claim as new, and desire to secure by Letters Patent, is—

1. In a refrigerator-car, the combination with a supporting iron bolted to the end-wall of the car and extending continuously from side to side of the car, and a number of supporting brackets secured to the floor of the car and formed with recesses in their upper ends, and a supporting iron secured in the recesses of the brackets and also extending continuously from side to side of the car, of refrigerating tanks adapted to rest upon the first mentioned supporting-iron and the iron supported by the brackets, substantially as set forth.

2. In a refrigerator-car, the combination with an angle iron (L-shaped in cross-section) bolted horizontally to the wall of the car, and having openings in its horizontal portion or arm, of supporting brackets resting upon the floor of the car, and each having a horizontal shoulder at its upper end, and a vertical and upwardly extending shoulder at the outer margin of the horizontal shoulder, and an opening in said vertical shoulder, and an angle iron arranged parallel with the first-named angle iron and resting on the horizontal shoulders of the brackets, and also having openings in its vertical arm registering with the openings of the vertical shoulders, and tie-bolts passing through said registering openings and having hooked ends engaging the openings of the horizontal arm of the first-named angle iron, and an opening in the end projecting through the vertical shoulder of the supporting bracket, and a wedge or pin engaging said opening, and a tank resting upon the said angle irons, substantially as set forth.

3. In a refrigerator-car, the combination with the tanks vertically supported, of a pair of retaining rails having notches in their front edges, and a frame-work removably held in said notches or recesses, and adjacent to the front faces of the tanks substantially as set forth.

4. In a refrigerator-car, the combination of a number of tanks, supported as described, with vertical retaining rails secured to the walls of the car and having recesses or notches in their edges, and recesses or depressions extending downwardly from the rear ends of the first named recesses or notches, and a frame-work consisting of horizontal beams adapted to engage said recesses or notches and vertical beams or bars connecting said horizontal beams, and blocks secured at the inner sides of said horizontal beams and bearing against the inner or front sides of the tanks, and a tie-bolt having one end passed through the said frame-work and engaged by a retaining nut, and its opposite end hooked, and an eye-bolt secured to the wall of the car, and engaged by the hooked end of the tie-bolt, substantially as set forth.

In testimony whereof I affix my signature in the presence of two witnesses.

THOMAS B. ROBERTS.

Witnesses:
MAUD FITZPATRICK,
M. P. SMITH.